2,785,106

PROCESS FOR MAKING ANTISEPTIC ARTICLE

Meyer Mendelsohn, New York, N. Y., assignor to Ions Exchange and Chemical Corp., New York, N. Y., a corporation of New York No Drawing. Application August 16, 1952, Serial No. 304,854

9 Claims. (Cl. 167—84)

The present invention relates to antiseptic articles of the general type disclosed in my co-pending application Ser. No. 294,908, filed June 21, 1952.

In said co-pending application I have described a process for incorporating silver in an organic polymeric base material, e. g. of a cellulosic or thermoplastic character, by treatment at elevated temperatures, i. e. between approximately 50° and 100° C., in an aqueous solution of a silver salt (preferably silver nitrate) whereby a highly effective self-sterilizing wound dressing is obtained. As also mentioned in said application, the process is enhanced by the presence of a catalyst such as sodium acetate or potassium acetate.

Tests have shown that variations in the operating conditions, notably in the composition of the treatment bath, will result in modifications of the silver content of the final product and that, moreover, in some cases the silver will be deposited largely in colloidal form whereas in other instances a more intimate combination with the base material will occur. It also appears that the germicidal and/or bacteriostatic effects of the silver are more pronounced in its compound form than in its colloidal state and that the silver when so bonded cannot be removed even by boiling water in which the product is washed. An important object of the present invention is, therefore, to provide a process for so producing an antiseptic article as hereinabove set forth that the silver content thereof will appear, at least to a large extent, in the form of a compound of silver with the base material.

Another object of this invention, allied with the preceding one, is to provide a process for producing an antiseptic article of this character having substantially maximum bacteriostatic and/or germicidal properties.

Still another object of the invention is to provide a novel composition of matter having the properties referred to.

A further object of the instant invention is to provide a process for producing an antiseptic article of the type described which is economical and permits the treatment of large quantities of material without renewal of the treatment solution.

It has been established, in accordance with this invention, that the amount of silver absorbed by the organic polymeric base material as well as the nature of this absorption (whether compound or colloidal) varies to a marked extent with the amount and the character of the catalyst, if any, used in the treatment. Other factors, such as the length of treatment and the temperature of the bath, also affect in large measure the concentration of silver in the final product without, however, having much apparent influence upon the character of the silver content.

More particularly, I have found that a treatment without any catalyst will result, even with the use of elevated temperatures (up to 100° C.) and long treatment periods (several days), in silver accumulations in the base material representing only a small fraction of one percent, substantially all in the metallic or colloidal state. A distinct improvement is obtained with the use of sodium thiosulfate $Na_2S_2O_3$ or potassium thiosulfate $K_2S_2O_3$ as a catalyst, the presence of this agent in moderate proportions (e. g. of the order of several percent of the treatment solution) resulting in an appreciable increase in the amount of silver deposit obtained; at least some part of the deposit is believed to be in compound forms. Best results in terms of compound formation have, however, been realized with the aid of a catalyst selected from the group which consists of sodium acetate and potassium acetate.

Tests performed on organic polymeric cellulosic and thermoplastic base materials treated with the aid of catalysts from the last-mentioned group have shown that these base materials form compounds with the silver, as evidenced by the precipitation of sodium chloride from a solution of this salt into which the treated material had been dipped, which appear to account for a high percentage of the silver found to have been retained in the material. I have been able to determine that low concentrations of catalyst, e. g. of the order of one percent, are equally effective in this respect as concentrations of several percent, but that the higher concentrations have the disadvantage of appreciably contaminating the bath so that successive treatments of different materials with the same solution will rapidly diminish in effectiveness. With concentrations of about 1% or less, on the other hand, the solution may remain effective for a week or longer.

Cellophane (regenerated-cellulose sheets), absorbent paper ("Aldex"), polyamide resins ("nylon"), and vinyl chloride and acrylonitrile copolymers ("Dynel") may be mentioned among the cellulosic and thermoplastic base materials suitable for the formation of silver compounds in accordance with the present invention. Suitable silver salts include silver nitrate, silver acetate, silver propionate and silver fluoride. A concentration of 1% of silver nitrate has been found satisfactory, as mentioned in my above-identified co-pending application; I have found that higher concentrations of silver salt either do not noticeably enrich the final product or else produce an excess of colloidal silver without particularly enhancing the formations of compounds.

It may be mentioned that the treatment in the presence of an acetate-type catalyst may proceed in neutral or slightly acidic solution whereas in the case of a thiosulfate-type catalyst the solution should be definitely alkaline. A white gauze treated with the aid of a catalyst of the latter type is found to retain substantially its original whiteness, which tends to increase its sales appeal when used for medicinal purposes. Gauzes treated with the more efficient acetate-type catalyst assume a reddish or brownish color.

Specific examples of treatment in accordance with the invention will now be given.

Example I

Cotton gauze is steeped in an aqueous solution of 1% silver nitrate, 4% sodium thiosulfate and 2% sodium hydroxide. The immersion is continued for 6–8 hours at 100° C. The resulting product, after washing and drying, has a silver content of 1.7%.

Example II

Cotton gauze is steeped in a 1% silver nitrate solution containing 0.7% sodium acetate. The immersion is continued for thirty minutes at 100° C. The resulting product has a silver content of 1.5%.

Example III

Same as in Example II, except that the immersion is extended to last one hour. The silver content of the final product is 2%.

*Example IV*

Cellophane is immersed for thirty minutes in a 1% silver nitrate solution containing 1% sodium acetate, at a temperature of 80° C. The resulting product has a silver content of 2%.

*Example V*

Same as in Example IV, except that the temperature is 90° C. The silver content rises to 8%.

*Example VI*

Same as in Example IV, except that the treatment time is one hour. The silver content rises to 5%.

*Example VII*

Same as in Example VI, but with the temperature raised to 90° C. The silver content reaches 22%.

*Example VIII*

Powdered alpha cellulose is treated in the manner described for cellophane in Example IV. The washed and dried powder has a silver content of 1.1%.

The following table shows the results of laboratory tests made with antiseptic articles according to this invention, prepared with the aid of sodium acetate as a catalyst. The numerical values given in each column indicate the depth, in millimeters, of a zone of inhibition within which the material described at the head of the column prevented the growth of microbes of the character set forth on the left.

|  | Cotton Gauze, 0.5% Ag | Cotton Gauze, 1% Ag | "Aldex" Paper, 2% Ag | "Nylon" (sheet), 0.5% Ag | "Nylon" bristles, 0.5% Ag | Cellophane, 1% Ag |
|---|---|---|---|---|---|---|
| Staphylococcus aureus | 4 | 4 | 4 | 4 | 2 | 3 |
| Streptococcus faecalis | 2 | 2 | 2 | 2 | 1 | 1.5 |
| Escherichia coli | 2 | 2 | 2 | 2.5 | 1.5 | 1.5 |
| Salmonella typhi | 1.5 | 1.5 | 2 | 2 | 1.5 | 1.5 |
| Salmonella paratyphi B | 1 | 1 | 1 | 1 | 1 | 0.5 |
| Vibrio comma | 3 | 3 | 3 | 3 | 1 | 2 |
| Klobsiella pneumoniae | 3 | 3 | 3 | 3 | 1 | 2 |
| Pseudomonas aeruginosa | 2 | 1.5 | 1.5 | 2 | 0.5 | 0.5 |
| Proteus vulgaris | 2 | 2 | 2 | 2 | 1 | 1.5 |
| Bacillus subtilis | 4 | 4 | 4 | 4 | 1.5 | 1.5 |
| Bacteridium anthracis | 5 | 5 | 5 | 5 | 3 | 3 |
| Streptococcus pyogenes | 4 | 4 | 4 | 4 | 1 | 3 |
| Diplococcus pneumoniae | 4 | 4 | 4 | 4 | 1.5 | 4 |
| Corynobacterium diphteriae | 4 | 4 | 4 | 4 | 0.5 | 3 |

Inasmuch as the germicidal and/or bacteriostatic action of substances according to the invention has been found to extend to the common water contaminants, it is also possible to utilize them as filters in purification plants. A suitable filter material is that described in Example VIII. Comminuted thermoplastic materials may be similarly treated to produce a filter substance.

I claim:

1. A process for incorporating silver in an organic base material selected from the group which consists of cellulosic and thermoplastic substances, said process comprising the steps of immersing said base material in an aqueous solution of a silver salt selected from the group which consists of silver nitrate, silver acetate, silver propionate and silver fluoride, at a temperature ranging between substantially 50° and 100° C. in the presence of a salt selected from the group which consists of sodium acetate and potassium acetate, said salt being present in a proportion of about 1% of said solution, and thereafter washing and drying said base material.

2. A process according to claim 1 wherein said base material is a polyamide resin.

3. A process according to claim 1 wherein said base material is a vinyl chloride and acrylonitrile copolymer.

4. A process for incorporating silver in a cellulosic base material, which comprises the steps of immersing said base material at a temperature ranging between substantially 50° and 100° C. in an aqueous solution of a water-soluble silver salt in the presence of a salt selected from the group which consists of sodium acetate and potassium acetate, and thereafter washing and drying said base material.

5. A process according to claim 4 wherein said silver salt is silver nitrate and is present in a proportion of about 1% of said solution.

6. A process according to claim 4 wherein said base material is alpha cellulose.

7. A process according to claim 4 wherein said base material is absorbent paper.

8. A process according to claim 4 wherein said base material is cotton gauze.

9. A process according to claim 4, wherein the step of immersion is continued for a time sufficient to attain a silver content of at least 1% in the washed and dried material.

References Cited in the file of this patent

UNITED STATES PATENTS

| 1,582,940 | Taub | May 4, 1926 |
| 2,396,514 | Kreidl | Mar. 12, 1946 |
| 2,459,896 | Schwarz | Jan. 25, 1949 |
| 2,459,897 | Schwarz | Jan. 25, 1949 |